Oct. 18, 1949.          G. G. ELLNER          2,485,267
APPARATUS FOR STERILIZING LIQUIDS
BY IRRADIATING MEANS
Filed Aug. 2, 1945          3 Sheets-Sheet 1
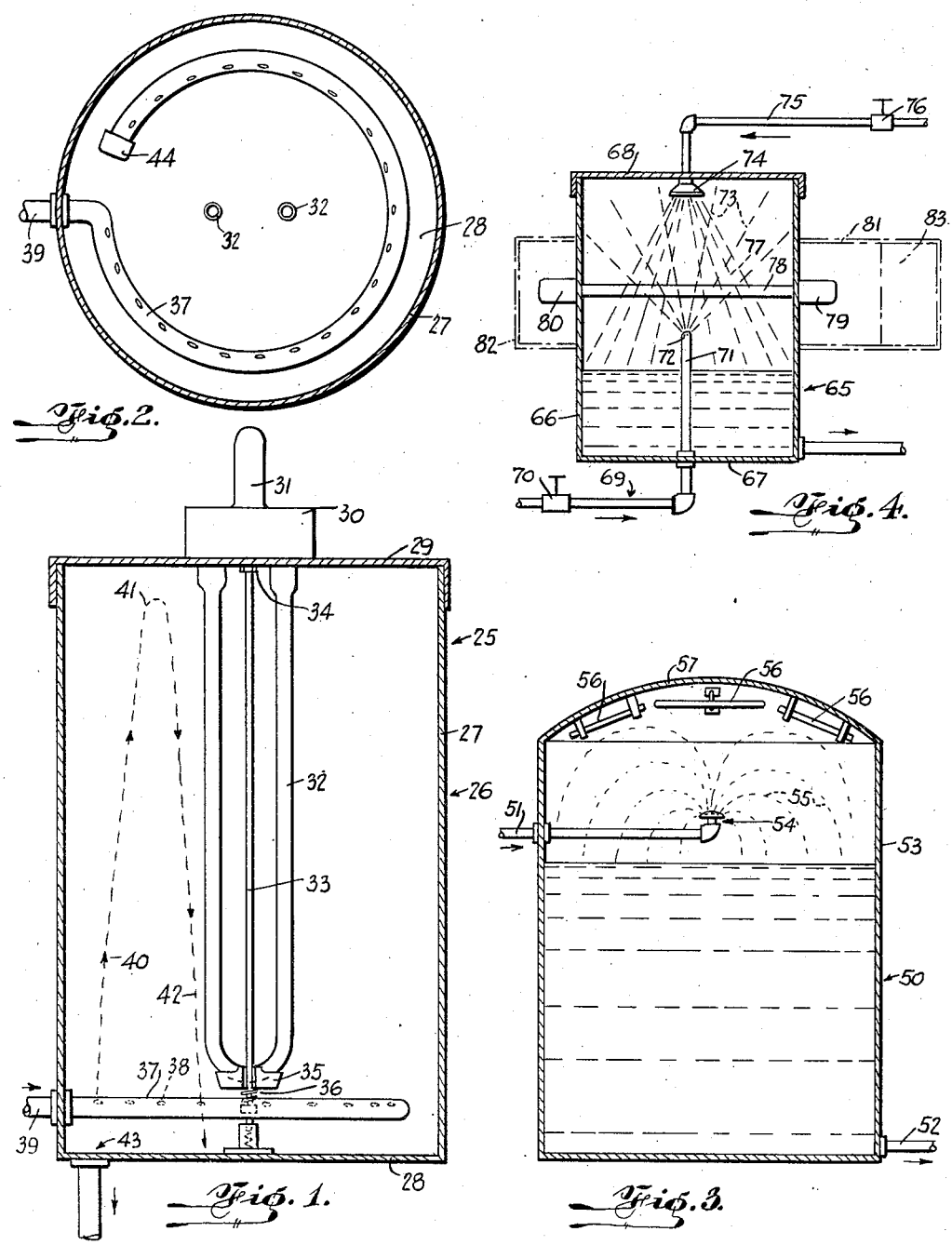
INVENTOR.
GEORGE G. ELLNER.
BY
Maxwell E. Sparrow
ATTORNEY.

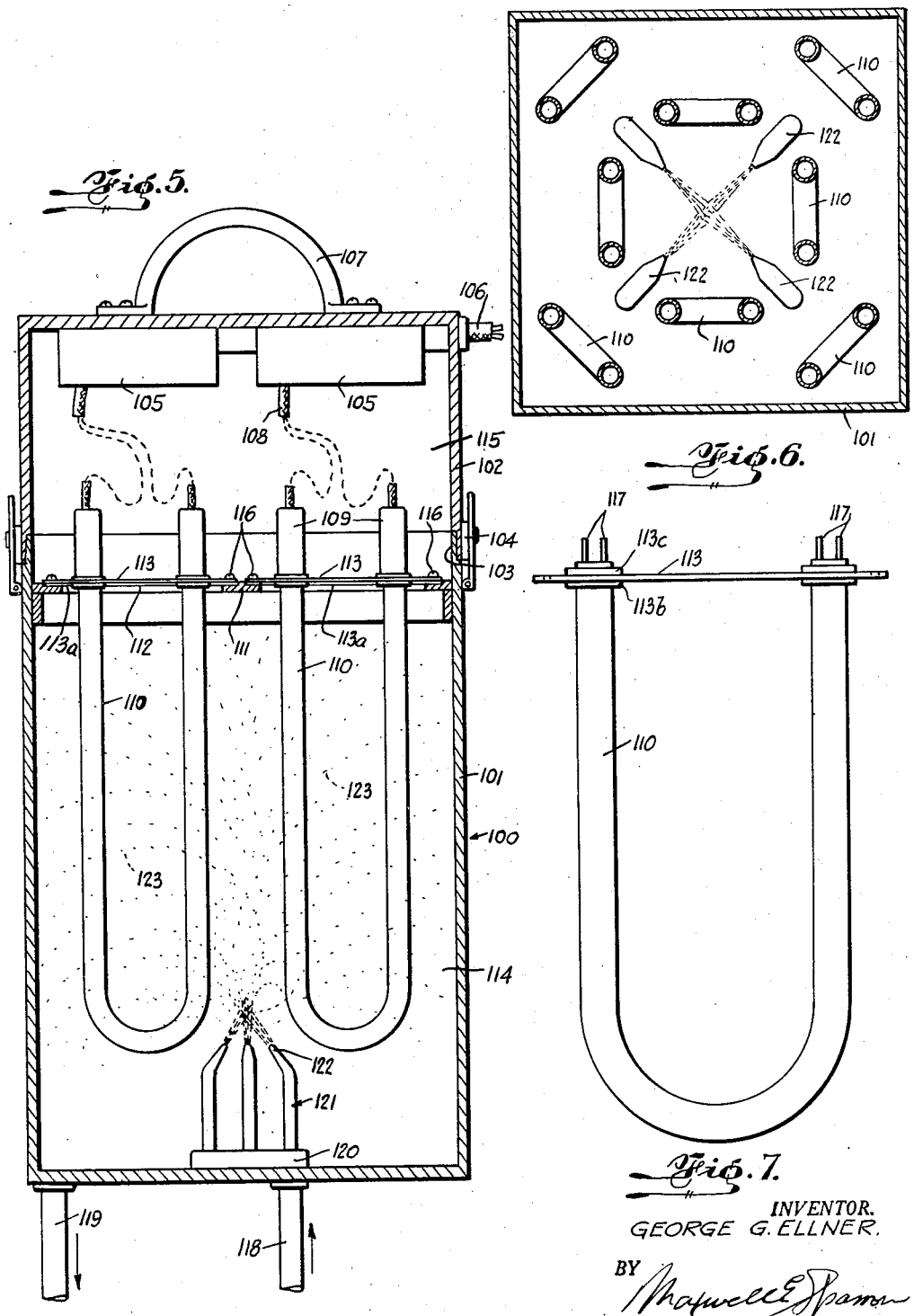

Oct. 18, 1949.  G. G. ELLNER  2,485,267
APPARATUS FOR STERILIZING LIQUIDS
BY IRRADIATING MEANS
Filed Aug. 2, 1945  3 Sheets-Sheet 3
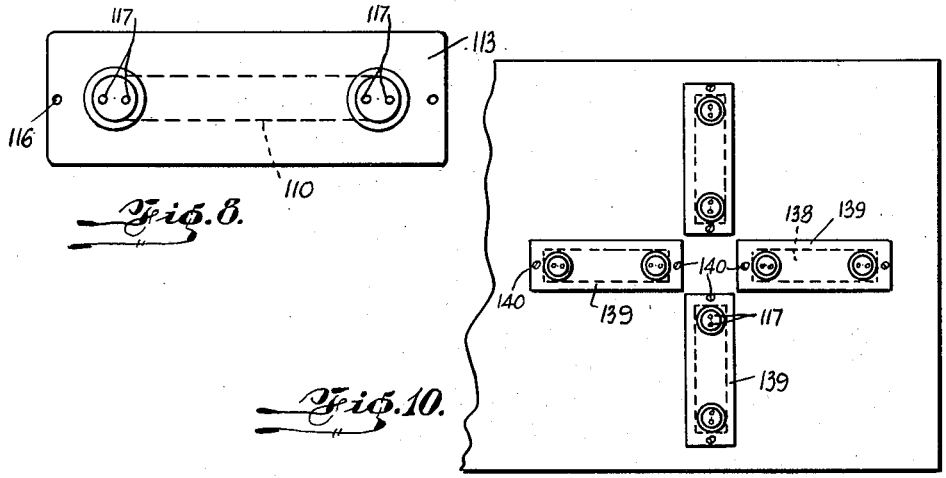
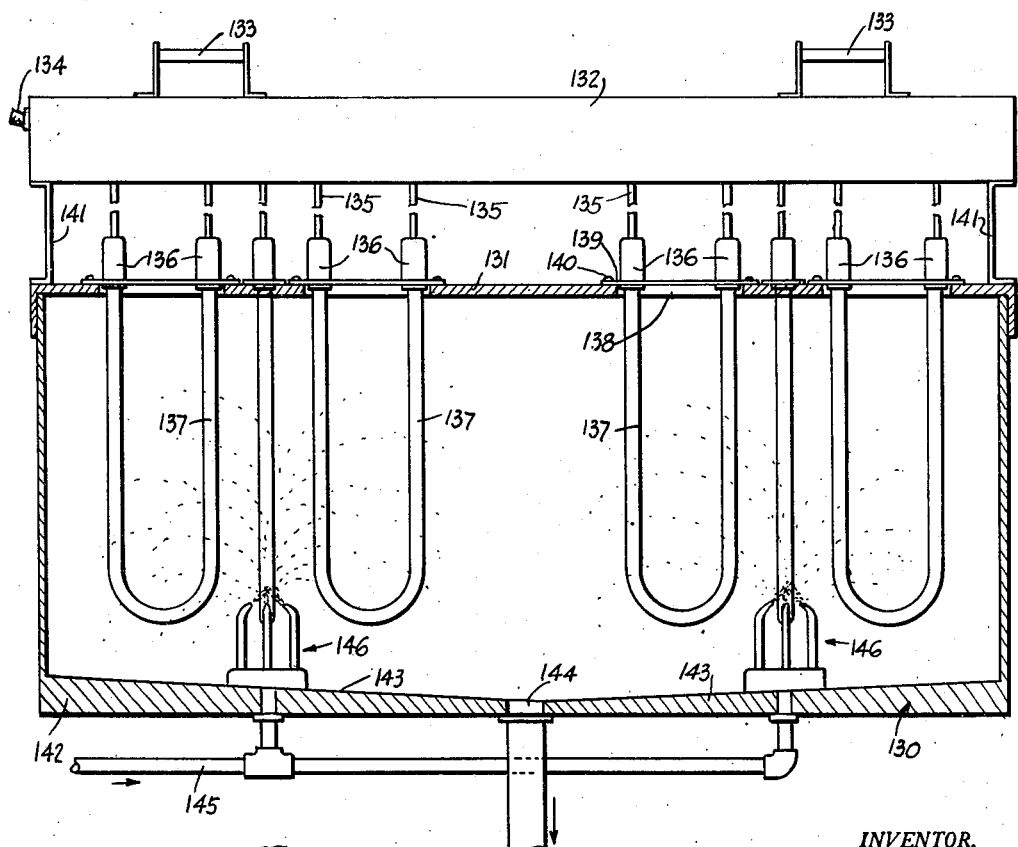
INVENTOR.
GEORGE G. ELLNER.
BY
ATTORNEY.

Patented Oct. 18, 1949

2,485,267

UNITED STATES PATENT OFFICE 2,485,267

APPARATUS FOR STERILIZING LIQUIDS BY IRRADIATING MEANS

George G. Ellner, Long Island, N. Y.

Application August 2, 1945, Serial No. 608,499

7 Claims. (Cl. 250—43)

This invention relates generally to the application of ray-emission means and has further reference to that class of devices employing electrical lamps, tubes or similar instrumentalities which generate the bactericidal band of the ultra-violet spectrum for destroying or appreciably reducing the number of bacteria, molds, yeasts algae, virus and other micro-organisms or other undesirable germs, and for other germicidal or sterilizing purposes, and to possibly replace pasteurization, heat or chemical sterilization and to eliminate the use of preservatives. It has more particular reference to devices employing tubular gaseous lamps or mercury discharge devices and spray or atomizing means for more effectually irradiating liquids made to flow through said devices, and is a continuation-in-part of my copending application Serial Number 484,156, filed April 23, 1943, now Patent No. 2,425,672, issued August 12, 1947.

It is an object of the present invention to provide ray-emission means installed in tanks, vehicles, compartments, and other containers or receptacles, in such a manner, as to provide a sterile environment surrounding the liquid to be treated as well as to intimately irradiate the liquid.

It is a further object of the present invention to provide for spraying or atomizing liquids in an enclosed chamber under the influence of sterilizing, bactericidal or other types of ultra-violet rays, infra-red or other rays. Such spraying or atomizing promotes a more thorough and effective sterilization or other desired treatment of the liquid than would be otherwise possible.

These means where used for bactericidal purposes may be employed to supplement pasteurization, just prior to bottling; or, where feasible, to replace pasteurization, since this method, when properly used, will prove highly effective as a means of destroying organisms which would cause fermentation and spoilage; or these means may be used to increase vitamin D content or other effects desired.

Since more rapid and more efficient ultra-violet or other irradiation may be accomplished on the liquid or other substance to be treated when in atomized, spray, suspension, colloidal, or homogenized form or condition, due to the rarification of the substances and the multiple reflection and refraction of the ultra-violet or other rays by the numerous fine particles of the liquid or other substance, further objects of the present invention are to provide means for effectively placing said liquid or other substance in such form or condition for irradiation treatment; to provide a suitable spraying, atomizing, homogenizing or similar arrangement to accomplish the desired breakdown of the liquid or other substance, and providing a chamber or vessel of predetermined size and shape into which the liquid or other substance is introduced in its new state and in which a source of ultra-violet rays of selected wave length or infra-red rays or other source of energy, is properly installed to rapidly and effectively impart increased vitamin D content or to sterilize, or heat, or otherwise treat the liquid or substance according to the predetermined source of energy, or combined sources of energy selected. In this manner, for example, a liquid or other substance to be treated could simultaneously be sterilized by means of bactericidal radiations, have its vitamin D content increased by exposure to a source of proper energy and have its temperature raised by means of infra-red influence.

Still a further object of the present invention is to irradiate liquids while in an atomized condition and then when disposed in thin sheets or films.

Yet another object of the present invention is to bring about a complete and positive atomization of the liquid prior to and during irradiation so that the ray-emission means is utilized in an effective manner for destroying, reducing or preventing the formation of fermentation, molding, bacterial, algaeic or other spoilage or changes in and for maintaining intact in good condition for appreciable periods the liquid.

The above and other objects and advantages of the invention will appear as the description proceeds. To enable others skilled in the art so fully to comprehend the underlying features thereof that they may embody the same by the numerous modifications in structure and relation contemplated by this invention, drawings depicting certain forms of the invention have been annexed as a part of this disclosure, and in such drawings, like characters of reference denote corresponding parts throughout all of the views, of which:

Fig. 1 is a sectional view of a device employing irradiating means and made in accordance with the invention;

Fig. 2 is a sectional view taken through line 2—2 of Fig. 1;

Figs. 3 and 4 are sectional views of tanks having irradiating means and made in accordance with the invention in modified forms;

Fig. 5 is a sectional view taken through a container showing the invention embodied in a form wherein the liquid to be irradiated is broken up or atomized for more thorough irradiation of the liquid;

Fig. 6 is a sectional view showing a typical top plan arrangement of nozzles and tubes employed in a device such as is illustrated in Fig. 5;

Fig. 7 is a side-elevational view of a U-tube made in accordance with the invention;

Fig. 8 is a top plan view of Fig. 7;

Fig. 9 is a partial sectional view taken through a container having a plurality of spray units; and Fig. 10 is a plan view of the right-hand portion of the cover of the container shown in Fig. 9, illustrating the typical arrangement of the tubes employed therein.

Referring now to the drawings (Figs. 1 and 2), the tank 25 comprises container portion 26 having side walls 27, bottom 28 and removable cover 29. Secured to cover 29 is a housing 30 for ballast transformer or other auxiliary and handle 31. Extending through cover 29 from housing 30 is a U-shaped irradiating tube 32, which may be of the ultra-violet type. Tube 32 is secured to sockets (not shown) in housing 30 in conventional manner. Housing 30 holds the electrical control, such as, an auxiliary ballast or transformer for tube 32. A supporting rod 33 is secured to cover 29 at 34, having a supporting head 35 on the bottom thereof held against tube 32 by spring 36. Near bottom 28 of housing 26 is a circular tube 37 having the perforations 38 and being connected to the supply line at 39. The liquid to be irradiated shoots out through the perforations 38 in an upward direction as indicated at 40 reaching its peak at 41 and then dropping as at 42, reaching the outlet tube at 43. During the ascent and descent of the spray, the liquid in this form will be subjected to the activating action of the irradiating tubes 32. Because of the particular form of tube 37, it will be necessary to close one of its ends 44.

The invention illustrated in Fig. 3 has application to a storage tank 50 having an inlet 51 and outlet 52. Inlet 51 is higher up on the wall 53 of tank 50 and is provided with a spray head 54 causing liquid passing through inlet 51 to leave spray head 54 in the form of a spray 55, subjecting the same to the irradiating influences of a plurality of irradiating lamps 56 secured to the dome-shaped cover 57 of tank 50.

The invention disclosed in Fig. 4 comprises tank or container 65 having side walls 66, bottom 67 and cover 68. Inlet 69 passes through bottom 67 and is preferably provided with a valve 70. Upright pipe portion 71 of inlet 69 has perforations 72 at its upper end, thus permitting the liquid to be irradiated to leave the tube 71 in the form of a spray 73. Another nozzle 74 is connected to an additional inlet pipe line 75 having valve 76, causing a spray 77 to be forced in downward direction in tank 65. Sprays 73 and 77 will thus cross each other causing a break-up of the liquid into fine particles which will thus be more efficiently irradiated by the tubes 78. In this modification the tubes 78 have their ends terminate in sockets 79, 80, without the container 65, and being covered by housings 81, 82. Housing 81 is preferably sub-divided forming a transformer compartment 83.

In Fig. 5, the invention is embodied in a tank or other container 100 comprising the body 101 and the cover 102. It is preferable that the cover be made to overlap the top of the body 101 as indicated at 103; the cover is secured to the body by means of clamps 104. Secured to cover 102 are the transformers or other electrical auxiliaries 105 supplied with electric current by the cable 106. A handle 107 facilitates the removal of cover 102. Coming from transformers 105 are cables 108 at the end of which are sockets 109 connecting with U-shaped ultra-violet or other suitable ray-emitting tubes 110. Housing 100 is provided with partition 111 having suitable openings 112 for insertion of tubes 110, each of said openings 112 being closed by a plate 113 which forms a brace and support for the tube 110 and also seals off the compartment 114 in body 101 from compartment 115 in cover 102. Liquid-tight gaskets 113a are provided between plates 113 and partition 111. It is also understood that lamp 110 is secured to plate 113 in a liquid-tight manner by such means as flanges 113b and 113c. Plate 113 is preferably made of suitable electric and corrosion resistant insulating material such as plastic composition. Plates 113 are held to partitions 111 by screws 116. Sockets 109 connect with prongs 117 of tube 110. At the bottom of compartment 114 is located an inlet 118 and outlet 119. Inlet tube 118 connects with a manifold 120, the top of which is provided with a plurality of nozzles 121 the tips 122 of which are directed toward each other thus causing the streams of liquid coming from the nozzles to violently impinge upon each other, causing the liquid to be atomized into a fine spray 123 which conditions the liquid for a more through sterilization by the activating lamps 110.

The embodiment of the invention illustrated in Figs. 9 and 10, comprises tank body 130 having a cover 131 and removable sections 132 for electrical auxiliaries, such as, transformers. Section 132 is preferably provided with handles 133 and has the current supply cable 134. A plurality of cables 135 emerge from section 132 at the ends of which are provided conventional sockets 136 connecting with U-tubes 137 within tank 130. Cover 131 is provided with openings 138 for the insertion of tubes 137, the said opening 138 being covered by plates 139 similar to plate 113 and secured thereto by screws 140. Section 132 is supported on cover 131 by legs 141.

Bottom 142 inclines in all directions as indicated at 143 towards the outlet 144. Inlet pipe 145 terminates in a plurality of spray heads 146 similar to spray heads 121 with respect to Fig. 5. Liquid entering through inlet 145 and spray heads 146 will be caused to become atomized and upon falling upon inclined surfaces 143, will form a film of liquid flowing towards outlet 144 and this film will be further irradiated by the sterilizing rays emitted by the tubes 137.

It will thus be seen that there has been provided by this invention devices in which the various objects hereinabove set forth, together with many thoroughly practical advantages, are successfuly achieved.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim:

1. A ray-emission device comprising a U-shaped lamp having terminals at its end portions, a rigid plate connecting said portions adjacent said terminals, a receptacle having an opening, a support at said opening, said plate being connected to said support, said lamp projecting with said receptacle, sockets for said lamp disposed over said plate, a cover for said receptacle, electrical control means for said lamp secured to said cover, flexible conductors connecting said lamp with said control means, and spray means in said receptacle, said spray means comprising a plurality of nozzles, each of said nozzles having an angularly-disposed tip portion, the said tip portions facing each other whereby liquids coming through said nozzles will be directed towards a central area and impinge upon each other.

2. A ray-emission device comprising a U-shaped lamp having terminals at its end portions, a rigid plate connecting said portions adjacent said terminals, a receptacle having an opening, a support at said opening, said plate being connected to said support, said lamp projecting within said receptacle, and spray means in said receptacle, said spray means comprising a plurality of nozzles, each of said nozzles having an angularly-disposed tip portion, the said tip portions facing each other whereby liquids coming through said nozzles will be directed towards a central area and impinge upon each other.

3. A ray-emission device for irradiating liquids comprising a receptacle, a plurality of ray-emission tubes extending within said receptacle, spray means in said receptacle, said spray means comprising a plurality of nozzles having angularly directed upper portions for causing sprays of liquid which may be forced through the nozzles to impinge upon each other.

4. In a ray-emission device for irradiating liquids, in combination, a receptacle, a source of ultra-violet rays in said receptacle, and a plurality of spray nozzles having outlets arranged so that streams of liquid discharged, respectively, by said nozzles will substantially entirely impinge upon one another whereby the degree of atomization of the liquid exposed to said rays will be increased.

5. In a ray-emission device, the combination according to claim 4, wherein said nozzles include a first and a second nozzle having outlets facing each other, said source of rays being positioned substantially midway between said first and second nozzles.

6. In a ray-emission device, the combination according to claim 5, wherein said first and second nozzles are positioned adjacent the bottom and the top of said receptacle, respectively.

7. In a ray-emission device, the combination according to claim 4, wherein said nozzles are disposed substantially parallel to and adjacent one another, said outlets being directed toward a common point of intersection.

GEORGE G. ELLNER.

REFERENCES CITED

The following references are of record in the file of this patent:

UNITED STATES PATENTS

| Number | Name | Date |
|---|---|---|
| 1,196,481 | Von Recklinghausen et al. | Aug. 29, 1916 |
| 1,659,085 | Cunningham et al. | Feb. 14, 1928 |
| 2,146,688 | Selig | Feb. 7, 1939 |

FOREIGN PATENTS

| Number | Country | Date |
|---|---|---|
| 16,110 | Great Britain | Oct. 19, 1911 |
| 468,216 | France | July 1, 1914 |